United States Patent
Kropf et al.

(10) Patent No.: US 9,600,736 B2
(45) Date of Patent: Mar. 21, 2017

(54) POSE DETECTION USING DEPTH CAMERA

(71) Applicant: International Business Machines Corporation, Armonk, NY (US)

(72) Inventors: Noel S. Kropf, Garrison, NY (US); Mattias Marder, Haifa (IL); Charles F Wiecha, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/753,006

(22) Filed: Jun. 29, 2015

(65) Prior Publication Data

US 2016/0379077 A1 Dec. 29, 2016

(51) Int. Cl.
| | |
|---|---|
| *G06K 9/00* | (2006.01) |
| *G06T 15/00* | (2011.01) |
| *G06K 9/46* | (2006.01) |
| *G06T 7/00* | (2017.01) |
| *G06K 9/52* | (2006.01) |
| *H04N 5/44* | (2011.01) |

(52) U.S. Cl.
CPC ............. *G06K 9/46* (2013.01); *G06K 9/4604* (2013.01); *G06K 9/52* (2013.01); *G06T 7/0051* (2013.01); *H04N 5/44* (2013.01)

(58) Field of Classification Search
CPC .. G06K 9/48; G06K 9/46; G06K 9/52; G06K 9/6204; G06K 9/4604; G06T 7/0083; G06T 7/0051; H04N 7/26643; H04N 5/44
USPC ....... 382/203, 100, 103, 190, 154, 201, 170, 382/192, 221; 342/442, 350, 457, 450; 704/235, 231, 200, 251; 706/45, 46, 52; 345/419, 420
See application file for complete search history.

(56) References Cited

U.S. PATENT DOCUMENTS

| | | | |
|---|---|---|---|
| 7,929,775 B2* | 4/2011 | Hager | G06K 9/00208 382/154 |
| 8,345,979 B2* | 1/2013 | Davis | G06T 7/0079 382/181 |
| 8,619,049 B2 | 12/2013 | Harrison et al. | |
| 8,958,600 B2* | 2/2015 | Othmezouri | G06K 9/00362 382/103 |
| 9,102,055 B1* | 8/2015 | Konolige | B25J 9/163 |
| 9,117,274 B2* | 8/2015 | Liao | G06T 7/0042 |
| 9,224,205 B2* | 12/2015 | Tsin | G06T 7/0046 |
| 9,327,406 B1* | 5/2016 | Hinterstoisser | B25J 9/1697 |
| 2013/0033484 A1 | 2/2013 | Liao et al. | |

FOREIGN PATENT DOCUMENTS

WO 2014189484 11/2014

\* cited by examiner

*Primary Examiner* — Sheela C Chawan
(74) *Attorney, Agent, or Firm* — Ziu Glazberg

(57) ABSTRACT

A computer-implemented method, computerized apparatus and computer program product for detecting an object's pose using a depth image. An image of an object in a scene and depth data of the scene are obtained. At least one pose hypothesis, representing a hypothesized plane, are determined based on the image. An incidence plane, hypothesized to be coplanar with the object, is determined based on the depth data. A relation indicating a level of consistency is determined between the hypothesized plane and the incidence plane for the at least one pose hypothesis.

18 Claims, 3 Drawing Sheets

POSE DETECTION USING DEPTH CAMERA

TECHNICAL FIELD

The present disclosure relates to pose detection in general, and to pose detection using depth camera, in particular.

BACKGROUND

The identification of objects in an image and determination of their position and orientation relative to some coordinate system is one of the fundamental tasks addressed to in the field of computer vision. The information comprising the position and orientation of an object is typically referred to as the "pose" of the object. The task of determining the pose of an object in an image is typically referred to as "pose estimation" or "pose detection".

An image captured by a camera is typically a projection of a three dimensional scene onto a two dimensional plane. Under the transformation, an object may appear in image coordinates as rotated and translated relative to real world coordinates. The transformation may also introduce a perspective distortion causing parallel lines to appear as intersecting. For example, a rectangular object may appear in the image as trapezoidal. Such distortions and displacements may be eliminated by a process referred to as "image rectification" or "image de-warping", in which the image is projected onto a different plane. The information of a pose of an object may be useful for performing image rectification, for example if the geometry of the physical object is known, as in the case of a rectangle shape.

BRIEF SUMMARY

One exemplary embodiment of the disclosed subject matter is a computer-implemented method comprising: obtaining an image of an object in a scene; obtaining depth data of the scene; determining, based on the image, at least one hypothesis of a pose of the object, wherein each of the at least one hypothesis represents a hypothesized plane; determining, based on the depth data, an incidence plane hypothesized to be coplanar with the object; and, determining for the at least one hypothesis a relation between the hypothesized plane and the incidence plane, wherein the relation indicates a level of consistency.

Another exemplary embodiment of the disclosed subject matter is a computerized apparatus having a processor, the processor being adapted to perform the steps of: obtaining an image of an object in a scene; obtaining depth data of the scene; determining, based on the image, at least one hypothesis of a pose of the object, wherein each of the at least one hypothesis represents a hypothesized plane; determining, based on the depth data, an incidence plane hypothesized to be coplanar with the object; and, determining for the at least one hypothesis a relation between the hypothesized plane and the incidence plane, wherein the relation indicates a level of consistency Yet another exemplary embodiment of the disclosed subject matter is a computer program product comprising a computer readable storage medium retaining program instructions, which program instructions when read by a processor, cause the processor to perform a method comprising: obtaining an image of an object in a scene; obtaining depth data of the scene; determining, based on the image, at least one hypothesis of a pose of the object, wherein each of the at least one hypothesis represents a hypothesized plane; determining, based on the depth data, an incidence plane hypothesized to be coplanar with the object; and, determining for the at least one hypothesis a relation between the hypothesized plane and the incidence plane, wherein the relation indicates a level of consistency.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to automatically and robustly detect the pose of an object in an image.

Another technical problem dealt with by the disclosed subject matter is to efficiently sift through a search space of hypotheses for the object's pose, which might be very large, as in the case of a cluttered scene or a rich background.

One technical solution is to obtain depth data of the scene captured in the image, extract from the depth image a plane coinciding with the object, and check for consistency of a given hypothesis of the object's pose with the plane. The pose hypotheses can be calculated by detecting edges in the intensity image to extract an edge map, and detecting line segments in the edge map being in conformity with the object's geometry. For example, if the object is a document consisting of a rectangular paper sheet, a hypothesis may take the form of an arbitrary quadrilateral.

One technical effect of utilizing the disclosed subject matter is to facilitate digitization of documents by mobile capturing devices, such as a digital camera or a mobile phone. Documents are frequently digitized using a digital scanner, such as a flat bed scanner. The scanned documents can be printed or stored for later viewing, or can be processed with an optical character recognition method to extract textual information. Scanners may use knowledge of calibration parameters and physical properties for segmenting the target document from the background in the captured image. For example, in case of flat objects, the scanner may use knowledge on the known background, being typically a single colored uniform background on which the target lies, or containing known visible markers. In case of objects with depth, such as books or magazines, a scanner equipped with depth sensing capabilities may use knowledge on the known relative position between the acquisition sensor and the target. Such knowledge however is absent when using a mobile capturing device, as there are no strict assumptions on the pose of the object relative to the camera, and the background may be non-uniform. Moreover, the object and the background may be coplanar, as in the case of a paper sheet lying on a table or posted on a wall, thus rendering depth segmentation inoperative. In contrast, document segmentation in accordance with the disclosed subject matter may be performed without prior knowledge on the background or on the object's whereabouts, by extracting document segmentation hypotheses from the intensity image of the captured scene and comparing the plane that each hypothesis represents to the plane registered by the depth camera.

Figure 1:
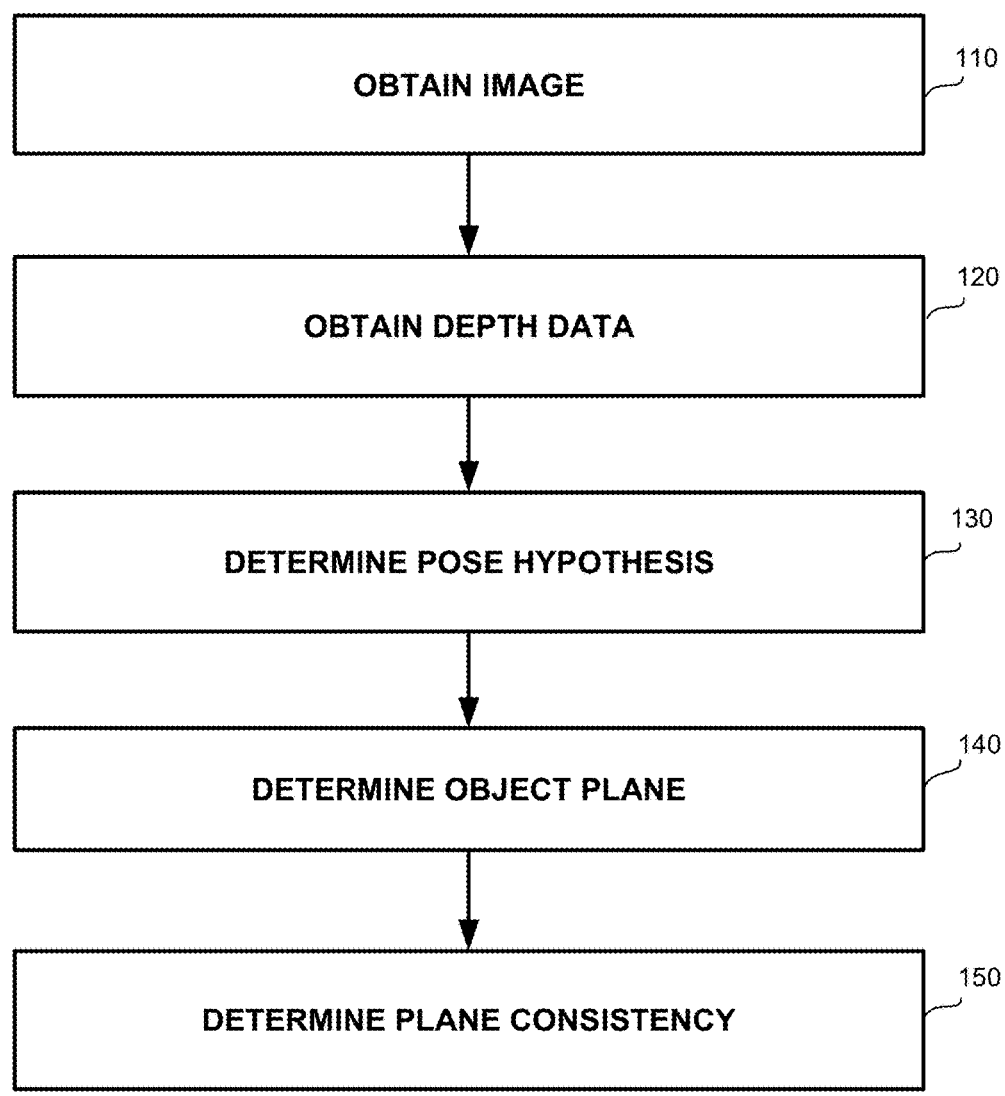
FIG. 1 shows a flowchart diagram of a method, in accordance with some exemplary embodiments of the disclosed subject matter.

Referring now to FIG. 1 showing a flowchart diagram of a method, in accordance with some exemplary embodiments of the subject matter.

On Step 110, an image of an object in a scene may be obtained. In some exemplary embodiments, the image may be a digital image of intensity values, such as a color image, a grayscale image, and the like. In some exemplary embodiments, the image may be an image originating from a mobile capturing device. In some exemplary embodiments, the object may be a document, such as a printed page, a book, a paper or the like. In some exemplary embodiments, the object may be a flat surface intended for displaying information and having a regular known shape, e.g., a screen, a board, or the like.

On Step 120, depth data of the scene, as captured in the image obtained on Step 110, may be obtained. In some exemplary embodiments, the depth data may be an image in which the pixels represent a distance from the camera of surface points of objects located at the corresponding three dimensional positions. The depth data may be obtained using a single capture range imaging device, such as a structured light scanner, a time-of-flight camera, and the like. Alternatively, the depth data may be obtained using a multi view capturing technique such as stereo image pair matching.

On Step 130, at least one hypothesis of a pose of the object may be determined based on the image obtained on Step 110. In some exemplary embodiments, each hypothesis may represent a plane hypothesized to be the incidence plane as projected by the camera to the image. In some exemplary embodiments, the at least one hypothesis may be determined by identifying a plurality of contour lines in the image, and determining from the plurality of contour lines at least one subset that may match the boundaries of the object as projected by the camera to the image. For example, in case of an object having a rectangular shape, any subset of contour lines outlining a quadrilateral may be determined as a matching hypothesis.

In some exemplary embodiments, the identification of contour lines in the image may be performed using edge detection techniques. For example, a Canny filter may be applied to the image and line segments may be extracted from the filtered image using a Hough transform.

On Step 140, an incidence plane hypothesized to be coplanar with the object may be determined based on the depth data obtained on Step 120. In some exemplary embodiments, the depth data may be processed to identify one or more planar surfaces in the depth image. The incidence plane may be determined from the one or more identified surfaces in accordance with a suitable criteria. For example, the incidence plane may be determined as the plane having the largest surface area, the plane being closest to the camera, the plane being most aligned with the camera, the plane having boundaries conforming to the geometry of the object, or the like.

In some exemplary embodiments, the incidence plane may be determined for each hypothesis based on a portion of the depth data corresponding to the hypothesized pose of the object. For example, only the pixels in the depth image that are enclosed by the boundaries of the object as represented by the hypothesis may be considered. The incidence plane may be determined by fitting a plane to the set of points as defined by the corresponding depth data, using plane fitting techniques such as least squares regression or the like.

On Step 150, a relation between the hypothesized plane, as represented by a hypothesis determined on Step 130, and the incidence plane determined on Step 140, may be determined. The relation may indicate a level of consistency between the hypothesized plane and the incidence plane, i.e. whether the planes are aligned together.

In some exemplary embodiments, the relation may be determined based on homography transformations calculated for each of the hypothesized plane and the incidence plane. A homography transformation is a projection between any two images of the same planar surface from different perspectives. In some exemplary embodiments, a reference plane and a reference point, and homographies T and T' projecting the incidence plane and the hypothesized plane, respectively, onto the reference plane, may be determined In some exemplary embodiments, the relation may be determined by applying T to the reference point to obtain a first projection, applying T' to the reference point to obtain a second projection, and determining a difference between the first projection and the second projection.

In some exemplary embodiments, the pose of the object may be determined responsive to the level of consistency indicated by the relation.

In some exemplary embodiments, image rectification may be performed as a post-processing step, by applying to the image a corresponding homography transformation as represented by the pose of the object. Alternatively, image rectification may be performed as a pre-processing step prior to pose detection, wherein a homography represented by the incidence plane extracted from the depth data may be applied to the image, whereby obtaining a rectified image, and wherein pose hypotheses may be determined based on the rectified image by examining subsets of contour lines arranged in a geometric form substantially matching the boundaries of the object. For example, in case of a rectangular object, pose hypotheses may be determined by searching in the rectified image for subsets of contour lines in which the contour lines form a quadrilateral with right angles.

Figure 2:
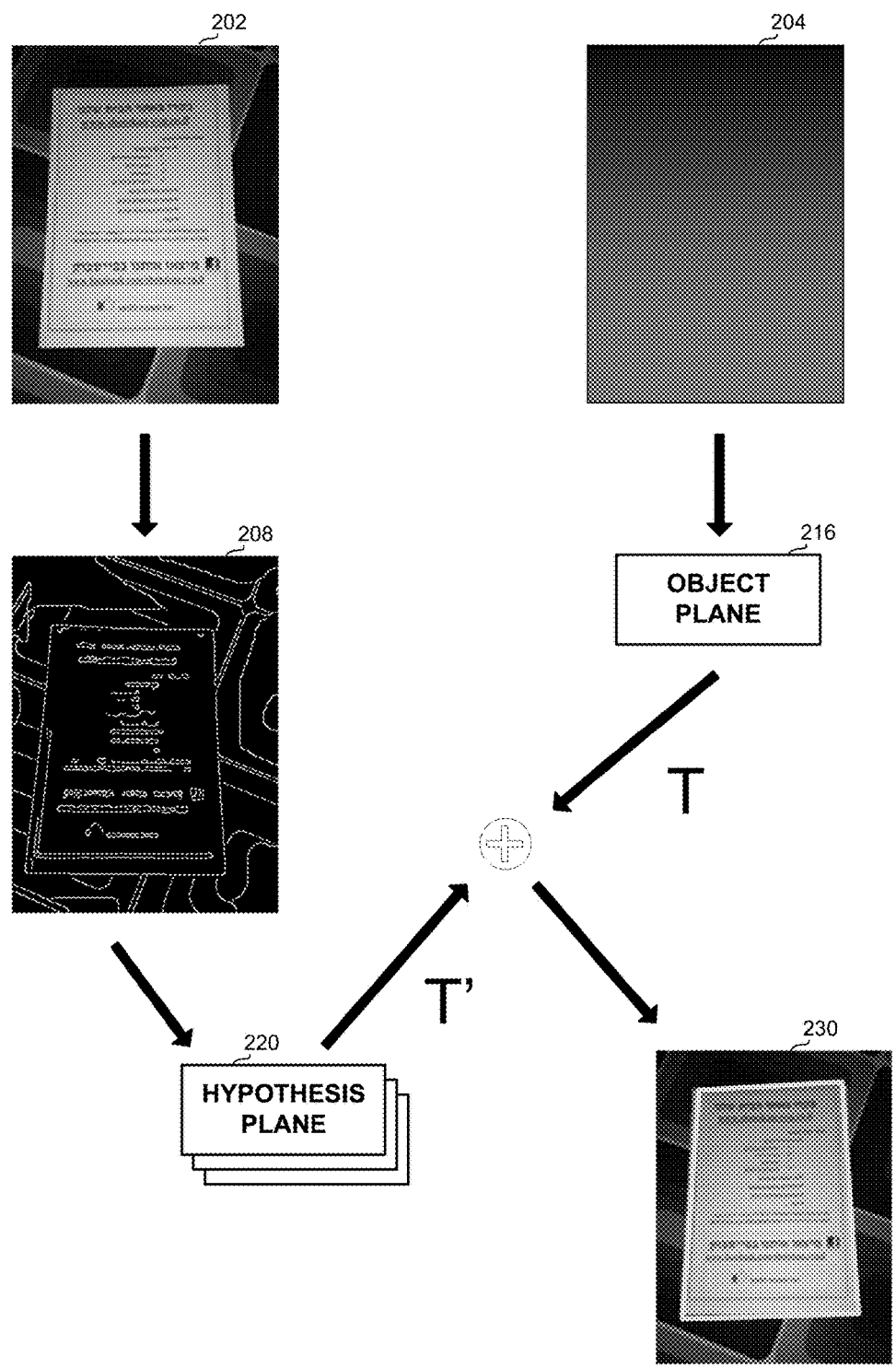
FIG. 2 shows an illustrative example of detecting pose of a document in an image, in accordance with some exemplary embodiments of the disclosed subject matter.

Referring now to FIG. 2 an illustrative example of detecting pose of a document in an image, in accordance with some exemplary embodiments of the disclosed subject matter.

An image 202 of a printed paper sheet document lying on a flat surface having a rich color texture, and a depth image 204 of the scene captured in image 202 relative to the same camera location may be received as input, similarly as in Step 110 and Step 120 of FIG. 1.

An edge map 208 comprising a plurality of line segments representing contour lines may be extracted from image 202. One or more pose hypotheses 220, each representing a hypothesized pose of the object in the image 202, may be determined from the edge map 208, as in Step 130 of FIG. 1.

An object plane 216, namely a plane in which the document is supposedly disposed relative to the camera, may be extracted from the depth image 204, as in Step 140 of FIG. 1.

For each pose hypothesis 220, plane consistency with the object plane 216 may be checked, similarly as in Step 150 of FIG. 1.

In some exemplary embodiments, plane consistency may be checked by comparing projections of a homography T calculated based on the object plane 216, and a homography T' calculated based on the pose hypothesis 220.

In some exemplary embodiments, the pose 230 of the document in image 202 may be determined based on a determination of plane consistency between the pose hypothesis 220 and the object plane 216.

Figure 3:
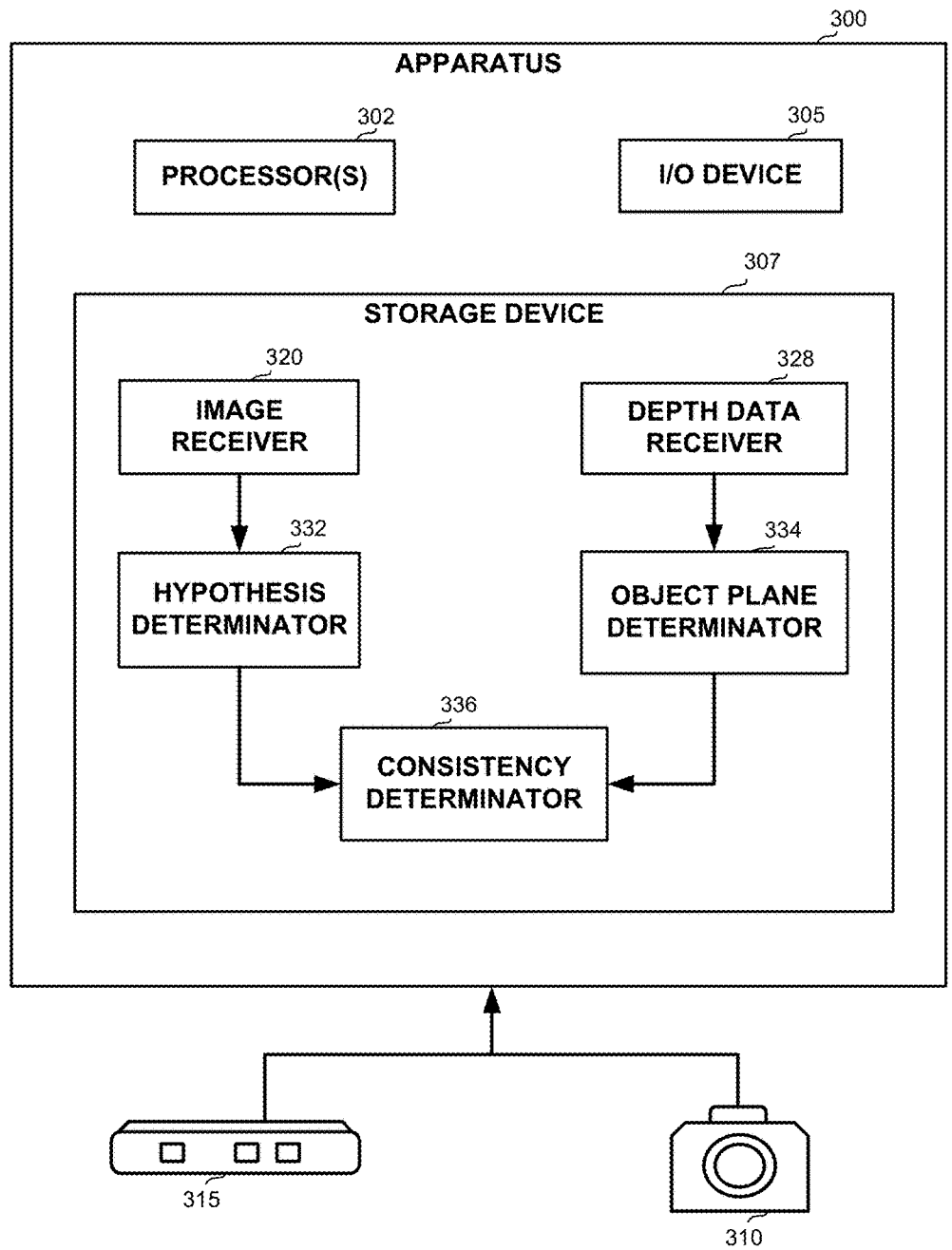
FIG. 3 shows a block diagram of an apparatus, in accordance with some exemplary embodiments of the disclosed subject matter.

Referring now to FIG. 3 showing a block diagram of an apparatus in accordance with some exemplary embodiments of the disclosed subject matter.

An Apparatus 300 may be configured to provide for detecting pose of an object in an image, in accordance with the disclosed subject matter. In some exemplary embodiments, Apparatus 300 may be a mobile computing device, such as a smartphone, a Personal Digital Assistant (PDA), or the like. Additionally or alternatively, Apparatus 300 may be a remote server which is configured to receive and analyze information obtained from mobile devices. In such an embodiment, a user may use a mobile device to capture information regarding a scene, such information may be communicated to Apparatus 300 for analysis, and the output of such analysis may be used by Apparatus 300 itself or by the mobile device which may receive it.

In some exemplary embodiments, Apparatus 300 may comprise one or more processor(s) 302. Processor 302 may be a Central Processing Unit (CPU), a microprocessor, an electronic circuit, an Integrated Circuit (IC) or the like. Processor 302 may be utilized to perform computations required by the apparatus 300 or any of it subcomponents.

In some exemplary embodiments of the disclosed subject matter, Apparatus 300 may comprise an Input/Output (I/O) Module 305. I/O Module 305 may be utilized to provide an output to and receive input from a user or other devices.

In some exemplary embodiments of the disclosed subject matter, Apparatus 300 may be coupled with a Camera 310 configured for capturing images of a scene. Camera 310 may be a charge coupled device (CCD) camera, a complementary metal oxide semiconductor (CMOS) camera, or the like. In some exemplary embodiments, Camera 310 may be a mobile capturing device.

In some exemplary embodiments of the disclosed subject matter, Apparatus 300 may be coupled with a Depth Sensor 315 configured for sensing depth data of a scene. Depth Sensor 315 may be a structured light three dimensional sensor, a time-of-flight camera, or the like. In some exemplary embodiments, Depth Sensor 315 and Camera 310 may be mounted on a same device so as to capture information regarding a same scene. As an example, Depth Sensor 315 and Camera 310 may be mounted on a same mobile device.

In some exemplary embodiments, Apparatus 300 may comprise a Storage Device 307. Storage Device 307 may be a hard disk drive, a Flash disk, a Random Access Memory (RAM), a memory chip, or the like. In some exemplary embodiments, Storage Device 307 may retain program code operative to cause the processor 302 to perform acts associated with any of the subcomponents of Apparatus 300.

In some exemplary embodiments, Storage Device 307 may comprise an Image Receiver 320, configured for obtaining an image of an object in a scene, such as in Step 110 of FIG. 1. The image may be obtained by Image Receiver 320 from Camera 310 or from another Apparatus 300 utilizing I/O Module 305.

In some exemplary embodiments, Storage Device 307 may comprise a Depth Data Receiver 328 configured for obtaining depth data of the scene, such as in Step 120 of FIG. 1. The depth data may be obtained by Depth Data Receiver 328 from Depth Sensor 315 or from another Apparatus 300 utilizing I/O Module 305.

In some exemplary embodiments, Storage Device 307 may comprise a Hypothesis Determinator 332 configured for determining one or more pose hypotheses based on the image obtained at Image Receiver 320, such as in Step 130 of FIG. 1.

In some exemplary embodiments, Hypothesis Determinator 332 may be configured to determine the pose hypotheses by identifying a plurality of contour lines in the image, and determining at least one subset of contour lines hypothesized as outlining the boundaries of the object. In some exemplary embodiments, Hypothesis Determinator 332 may be configured to determine the subset of contour lines based on the contour lines in the subset being arranged in conformity with geometry of the object.

In some exemplary embodiments, Storage Device 307 may comprise an Object Plane Determinator 334 configured for determining an incidence plane hypothesized to be coplanar with the object, based on the depth data received at Depth Data Receiver 328, such as in Step 140 of FIG. 1.

In some exemplary embodiments, Object Plane Determinator 334 may be configured to determine the incidence plane separately for each of the pose hypotheses based only on a portion of the depth data corresponding to the object's hypothesized pose.

In some exemplary embodiments, Storage Device 307 may comprise a Consistency Determinator 336, configured for determining a relation indicating a level of consistency between a hypothesized plane represented by a pose hypothesis as determined by Hypothesis Determinator 332 and the incidence plane determined by Object Plane Determinator 334, such as in Step 150 of FIG. 1.

In some exemplary embodiments, Consistency Determinator 336 may determine the relation by determining a difference between projections of a homography T, calculated from the incidence plane as determined by Object Plane Determinator 334, and a homography T', calculated from a hypothesized plane represented by a pose hypothesis as determined by Hypothesis Determinator 332.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   obtaining an image of an object in a scene;

obtaining depth data of the scene;
determining, based on the image, at least one hypothesis of a pose of the object, wherein each of the at least one hypothesis represents a hypothesized plane;
determining, based on the depth data, an incidence plane hypothesized to be coplanar with the object; and,
determining for the at least one hypothesis a relation between the hypothesized plane and the incidence plane, wherein the relation indicates a level of consistency, wherein said determining the relation between the hypothesized plane and the incidence plane is performed by a processor;
wherein determining the relation comprises:
  determining a reference plane;
  determining a homography T between the incidence plane and the reference plane;
  determining a homography T between the hypothesized plane and the reference plane;
  determining a reference point;
  determining a first projection by applying T to the reference point;
  determining a second projection by applying T' to the reference point; and,
  determining a difference between the first projection and the second projection,
  wherein the relation is determined based on the difference.

2. The computer-implemented method of claim 1, further comprising:
responsive to the level of consistency indicated by the relation, determining the pose of the object.

3. The computer-implemented method of claim 1, wherein determining the at least one hypothesis comprises:
identifying a plurality of contour lines in the image; and
determining at least one subset of contour lines hypothesized as outlining the boundaries of the object.

4. The computer-implemented method of claim 3, wherein said identifying comprises edge detection.

5. The computer-implemented method of claim 3, wherein the contour lines in each of the at least one subset of contour lines are arranged in conformity with the geometry of the object.

6. The computer-implemented method of claim 3, wherein the object is of rectangular shape and the contour lines in each of the at least one subset of contour lines are arranged in a form of a quadrilateral.

7. The computer-implemented method of claim 1, wherein determining the incidence plane comprises: for each of the at least one hypothesis, considering only a portion of the depth data corresponding to the hypothesized pose of the object.

8. The computer-implemented method of claim 7, wherein determining the incidence plane further comprises fitting a plane to the portion of the depth data.

9. The computer-implemented method of claim 1, further comprising performing image rectification.

10. The computer-implemented method of claim 1, wherein the object is a document.

11. The computer-implemented method of claim 1, wherein the image is captured by a camera of a mobile device.

12. A computerized apparatus having a processor, the processor being adapted to perform the steps of:
obtaining an image of an object in a scene;
obtaining depth data of the scene;
determining, based on the image, at least one hypothesis of a pose of the object, wherein each of the at least one hypothesis represents a hypothesized plane;
determining, based on the depth data, an incidence plane hypothesized to be coplanar with the object; and,
determining for the at least one hypothesis a relation between the hypothesized plane and the incidence plane, wherein the relation indicates a level of consistency;
wherein determining the relation comprises:
  determining a reference plane;
  determining a homography T between the incidence plane and the reference plane;
  determining a homography T between the hypothesized plane and the reference plane;
  determining a reference point;
  determining a first projection by applying T to the reference point;
  determining a second projection by applying T' to the reference point; and,
  determining a difference between the first projection and the second projection,
  wherein the relation is determined based on the difference.

13. The computerized apparatus of claim 12, wherein the processor is further adapted to determine the pose of the object responsive to the level of consistency indicated by the relation.

14. The computerized apparatus of claim 12, wherein determining the at least one hypothesis by the processor comprises:
identifying a plurality of contour lines in the image; and
determining at least one subset of contour lines hypothesized as outlining the boundaries of the object.

15. The computerized apparatus of claim 12, wherein determining the incidence plane by the processor comprises: for each of the at least one hypothesis, considering only a portion of the depth data corresponding to the hypothesized pose of the object.

16. The computerized apparatus of claim 15, wherein determining the incidence plane by the processor further comprises fitting a plane to the portion of the depth data.

17. The computerized apparatus of claim 12, wherein the processor is further adapted to perform image rectification.

18. A computer program product comprising a computer readable storage medium retaining program instructions, which program instructions when read by a processor, cause the processor to perform a method comprising:
obtaining an image of an object in a scene;
obtaining depth data of the scene;
determining, based on the image, at least one hypothesis of a pose of the object, wherein each of the at least one hypothesis represents a hypothesized plane;
determining, based on the depth data, an incidence plane hypothesized to be coplanar with the object; and,
determining for the at least one hypothesis a relation between the hypothesized plane and the incidence plane, wherein the relation indicates a level of consistency;
wherein determining the relation comprises:
  determining a reference plane;
  determining a homography T between the incidence plane and the reference plane;
  determining a homography T between the hypothesized plane and the reference plane;
  determining a reference point;
  determining a first projection by applying T to the reference point;

determining a second projection by applying T' to the
   reference point; and,
determining a difference between the first projection
   and the second projection,
wherein the relation is determined based on the difference.

* * * * *